(12) United States Patent
Aleksic et al.

(10) Patent No.: US 6,992,675 B2
(45) Date of Patent: Jan. 31, 2006

(54) SYSTEM FOR DISPLAYING VIDEO ON A PORTABLE DEVICE AND METHOD THEREOF

(75) Inventors: Milivoje Aleksic, Richmond Hill (CA); Steven Turner, Kettleby (CA)

(73) Assignee: ATI Technologies, Inc., Thornhill (CA)

( * ) Notice: Subject to any disclaimer, the term of this patent is extended or adjusted under 35 U.S.C. 154(b) by 101 days.

(21) Appl. No.: 10/357,590

(22) Filed: Feb. 4, 2003

(65) Prior Publication Data

US 2004/0150647 A1 Aug. 5, 2004

(51) Int. Cl.
*G06T 9/00* (2006.01)

(52) U.S. Cl. .................. 345/555; 345/547; 382/235
(58) Field of Classification Search .............. 345/547, 345/555, 556, 418; 382/235, 236, 244; 123/55.6 X
See application file for complete search history.

(56) References Cited

U.S. PATENT DOCUMENTS 5,835,082 A * 11/1998 Perego .................... 345/555
6,002,802 A * 12/1999 Chujoh et al. ............ 382/236

OTHER PUBLICATIONS

U.S. Appl. No. 10/083,903, filed Feb. 27, 2002, Mizuyabu et al.
U.S. Appl. No. 10/083,917, filed Feb. 27, 2002, Mizuyabu et al.
U.S. Appl. No. 10/083,875, filed Feb. 27, 2002, Mizuyabu et al.

* cited by examiner

*Primary Examiner*—Matthew C. Bella
*Assistant Examiner*—Mackly Monestime
(74) *Attorney, Agent, or Firm*—Toler, Larson & Abel, LLP

(57) ABSTRACT

A system and methods are provided for processing graphics to be displayed in a portable device. A current mode of operation of the portable device is identified. In a normal mode of operation, image data associated with the portable device is rendered by a graphics system of the portable device and stored in memory external to the graphics system prior to display. When a screen refresh mode of operation is identified, image data rendered by the graphics system is compressed and stored in memory integrated internal to the graphics system. The present disclosure has the advantage of allowing the memory external to the graphics system to be disabled during the screen refresh mode of operation, reducing power consumed by the portable device.

19 Claims, 4 Drawing Sheets

SYSTEM FOR DISPLAYING VIDEO ON A PORTABLE DEVICE AND METHOD THEREOF

CO-PENDING APPLICATIONS

This application is related to U.S. patent application Ser. No. 10/083,903 entitled "SYSTEM FOR REDUCED POWER COMSUMPTION BY PHASE LOCKED LOOP AND METHOD THEREOF" filed on Feb. 27, 2002.

FIELD OF THE DISCLOSURE

The present disclosure relates generally to displaying video data and more particularly to reducing power to display video data.

BACKGROUND

Handheld devices, such as personal digital assistants (PDA) and mobile phones, are now being equipped with hardware and software to handle several different computing tasks. Handheld devices are being equipped with communications adapters to allow the handheld devices to access the Internet and information handling systems, such as other handheld devices. Handheld devices are also being used to process multimedia data, such as audio and video data. Many handheld devices are capable of playing video. Handheld devices are being integrated with more components to handle the increased functionality. However, as more components are integrated with the handheld devices, and as processing capabilities increase, the handheld devices draw more power.

Power is limited on most handheld devices, unlike most desktop computers that take power from a power supply connected to an alternating current (AC) power outlet and generally don't need to worry about conserving power. Handheld devices generally take their power from standard power cells. Because handheld devices are designed to be small and light to make them portable for consumers, their power cells are generally selected to be small and light to not hinder the portability of the device. However, the increased processing needed to handle new functionality, such as communications or multimedia playback, takes more power than general processing tasks for which the handheld devices were originally intended.

Current methods of reducing power consumption are not adequate. For example, during a screen refresh mode in a handheld device with a liquid crystal display (LCD), external memory used to store image data for an LCD controller continues to consume power. Power for the handheld device can be reduced by utilizing internal memory associated with the LCD controller; however, the size of the internal memory may not be adequate to store the image data. Furthermore, increasing the size of the internal memory is costly due to the amount of area used by the internal memory as well as the amount of power to be consumed by a larger memory unit. From the above discussion, it is apparent that an improved method of conserving power within a system would be useful.

DETAILED DESCRIPTION OF THE FIGURES

At least one embodiment of the present disclosure provides a method of outputting rendered video data. The method includes receiving an image data. The image data represents unrendered data generated within a system, such as a portable information system, to be rendered for output to a display device, such as a liquid crystal display (LCD). In one embodiment, a current mode of operation associated with the system is identified. The method includes, when in a first mode of operation, rendering the image data to generate rendered image data and providing the rendered image data to a display device driver. The method also includes, when in a second mode of operation, rendering the image data to generate a rendered image data, compressing the rendered image data to generate a compressed image data. The method then includes, in the second mode of operation, decompressing the compressed image data to regenerate the rendered compressed image data and providing this decompressed image data to the display device driver. In one embodiment, the first mode of operation represents an active mode of operation, in which frames of images to be displayed are changing frame-to-frame. The second mode of operation represents a compressing mode of operation, and can include a screen-refresh mode in which the frames to be displayed do not change and processing within the system is reduced. One advantage of the present disclosure is that memory integrated within a rendering device can be used to store rendered data in compressed form, allowing power consumed by memory external to the rendering device to be reduced.

Figure 1:
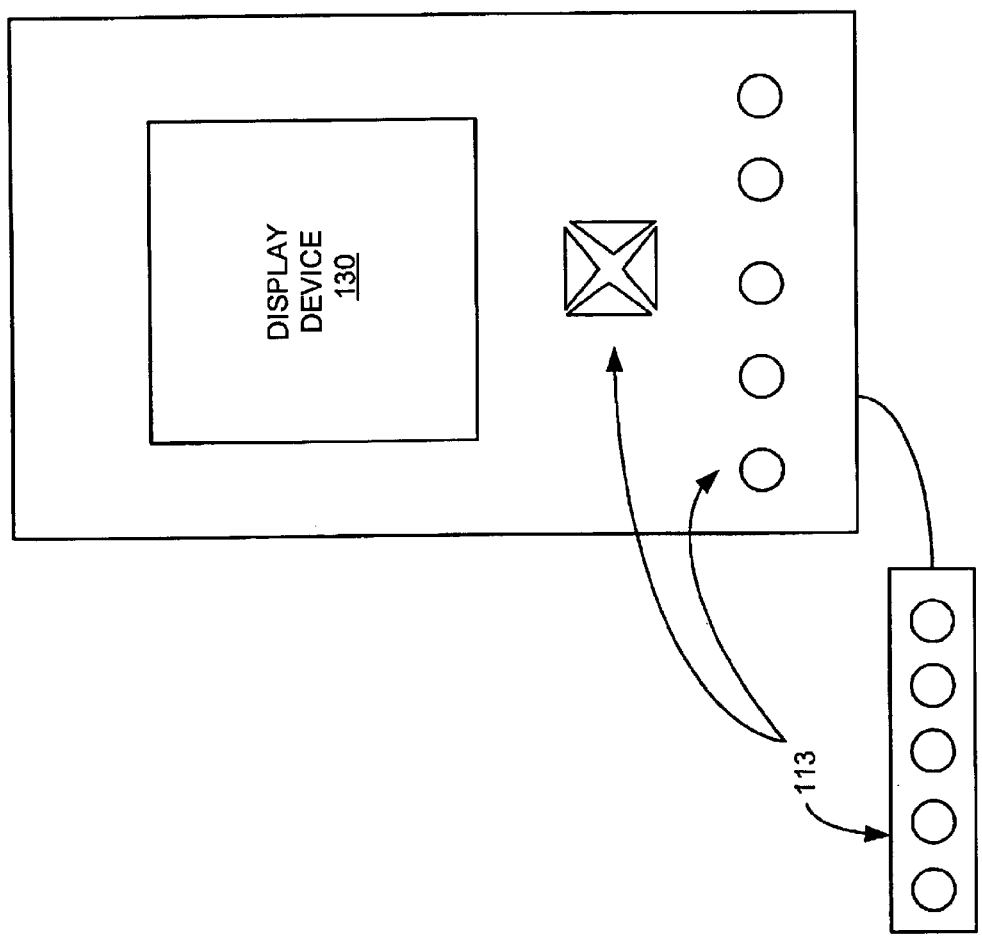
FIG. 1 illustrates, in block diagram form, a handheld device, according to at least one embodiment of the present disclosure.

Referring now to FIG. 1, a handheld device is shown and referenced generally as handheld device 100, according to one embodiment of the present disclosure. Device 100 represents a portable information system, an information handling system fitted to a portable package, such as a personal digital assistant (PDA). Device 100 includes a user input 113 for accepting user control. User input 113 can include keys, or buttons, located on device 100, or an external keypad interfaced with device 100 as well as a touch-panel. Device 100 includes a display device 130 for presenting graphics related to device 100. It will be appreciated that user input 113 can include other components for providing interface with a user. Display device 130 is generally used to present image data, including graphics, generated from device 100. In one embodiment, display device 130 includes a liquid crystal display (LCD) screen, or another type of display device 130, selected to reduce a total amount of power consumed by device 100.

Power cells (not shown), such as batteries are generally used to power device 100. Accordingly, device 100 generally has a limited amount of usable time before the power cells are to be replaced. The amount of usable time is based on an amount of power stored by the power cells and an amount of power consumed per unit time by device 100. The amount of power consumed per unit time by device 100 is further based on amounts of power consumed per unit time by components of device 100. The type of display device 130 used can affect an amount of power consumed by device 100 and the amount of usable time available based on the current power cells. In one embodiment, portions of device 100 are shut down during different operating modes of device 100. Accordingly, power consumed by device 100 can be reduced when device 100 is in a lower mode of operation, such as a screen refresh mode, as will subsequently be discussed.

Figure 2:
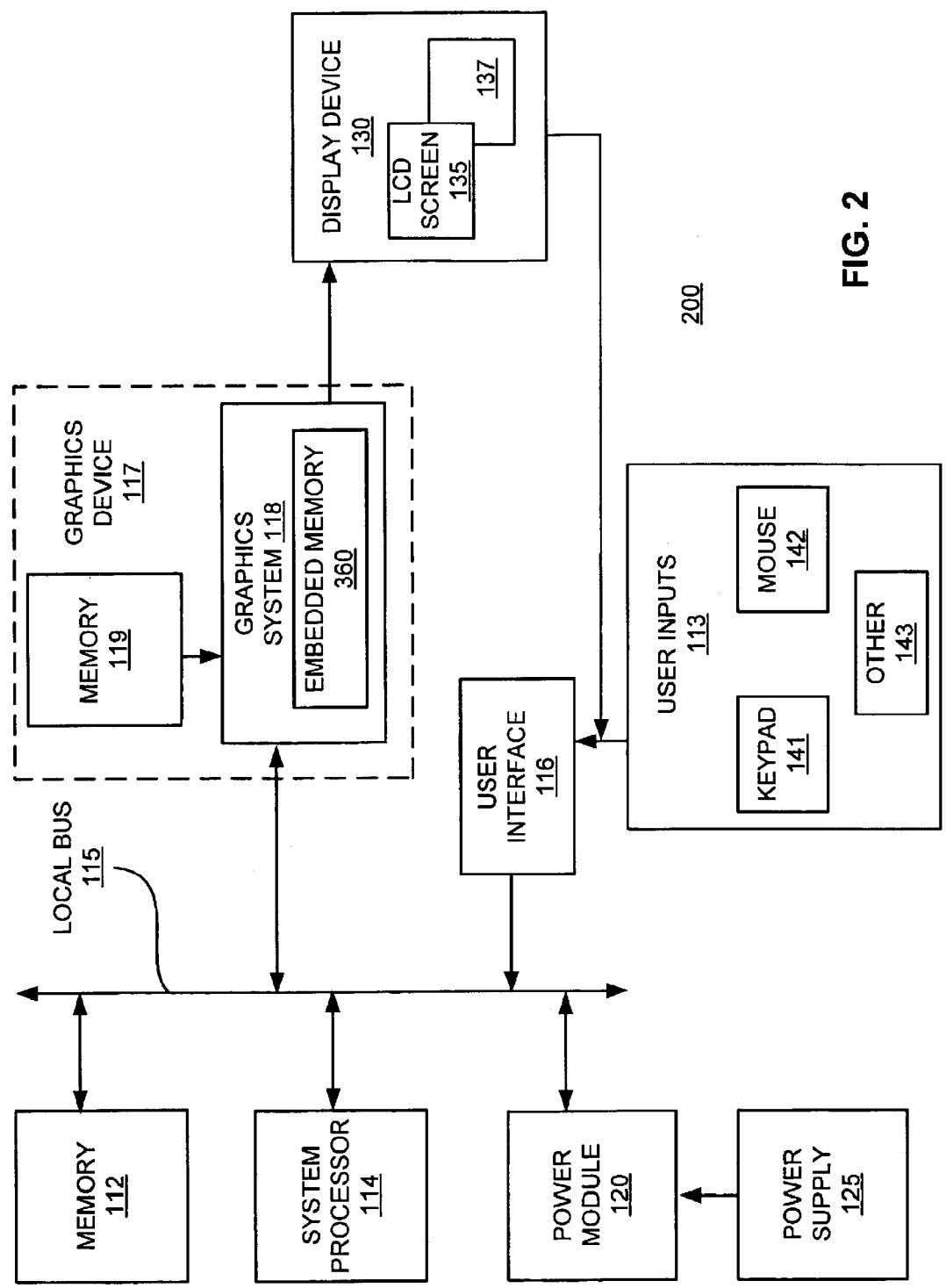
FIG. 2 illustrates, in block diagram form, a system for providing video associated with the handheld device of FIG. 1, according to one embodiment of the present disclosure.

Referring now to FIG. 2, a system for displaying image data associated with the device 100 of FIG. 1 is shown and referenced generally as system 200, according to one embodiment of the present disclosure. System 200 includes a graphics device 117, memory 112, system processor 114, power module 120, power supply 125, user interface 116, user inputs 113, and display device 130. A local bus 115 is used to pass data between components of system 200. Graphics device 117 is used to process image data, including graphics and video data, associated with system 200 for presentation on display device 130. Power module 120 is capable of acting as a select module to enable/disable components of system 200 and altering functionality performed by graphics device 117 to reduce power based on a particular operating mode of system 200.

System processor 114 interprets and executes instructions within system 200. The system processor 114 can also provide control over other portions of system 200. System processor 114 can access portions of memory 112 to run applications. Memory 112 represents a form of data storage associated with system 200. Memory 112 can include random access memory (RAM), such as static dynamic RAM (SDRAM). Memory 112 can include a form of onboard memory, integrated with system 200. Memory 112 can also include interfaced memory, such as a flash memory card, or Smartmedia memory device, which is interfaced with system 200. Memory 112 represents memory integrated with system 200, but external to graphics device 117. The system processor 114 can also provide graphics and video data to be displayed on display device 130 based on the applications run.

Power to run components of system 200, is derived from an external power supply 125 which includes a portable power source, such as batteries. The power module 120 can be used to regulate and distribute power from power supply 125 to portions of device 100, including system 200. In one embodiment, the power module 120 also provides power from power supply 125 to display device 130.

Display device 130 includes an LCD display 135. In one embodiment, display device 130 includes a display device driver (not shown, such as an LCD driver), to interpret signals provided by graphics device 117, such as through a display device interface (not shown), such as an LCD interface. The LCD driver powers elements of LCD screen 135 to display characters and images generated by system 200. In one embodiment, a user depresses portions of LCD screen 135, which includes a touch-panel 137. The touch-panel 137 detects the portions of LCD screen 135 selected by the user depressions and provides signals associated with the selections to the user interface 116.

User interface 116 provides user selections gathered from a variety of input sources, such as touch-panel 137 and user inputs 113, to the system 200. In one embodiment, user inputs 113 include a keypad 141, a mouse 142, and other user input devices 143.

Graphics device 117 is used to process image data associated with system 200 into rendered image data for presentation on display device 130. Graphics device 117 can include a rendering device, such as graphics system 118, for processing the image data. In one embodiment, graphics device 117 includes memory 119 for storing data for graphics system 118. While memory 112 represents memory external to graphics device 117, memory 119 represents memory integrated wit graphics device 117 but external to graphics system 118. Graphics system 118 is used to render received image data into rendered image data, or display data. In one embodiment, the graphics system 118 is used to render the image data, store rendered image data associated with the received image data and provide the rendered image data to the display device 130. The amount of rendered image data to be stored is generally larger than the size of memory available internal to the graphics system 118, such as embedded memory 360. Note that components of the graphics system 118, such as the embedded memory 360, are integrated components to the extent that they are formed on a common semiconductor. Accordingly, in conventional systems, the rendered image data is stored in other memory external to the graphics system 118, such as memory 112. Memory 112 can be used to store operating system data for system 200 or image data for graphics system 118. In addition to memory 112, system 200 can have other memory integrated in system 200, external relative to graphics system 118, that can be used by graphics system 118. However, memory 112 and 119 require additional power for accessing data.

In one embodiment, power module 120 is used to disable portions of system 200 based on a detected mode of operation. During an active, or normal mode of operation, in which graphics to be displayed on display device 130 is changing, graphics system 118 stores the rendered image data in memory 112 and/or memory 119. In the active mode of operation, power module 120 can allow all or most of the portions of device 100 to be powered. Accordingly, in the active mode of operation, all or most functionality associated with the device 100 can be made available.

Alternatively, in a screen refresh mode of operation, an image to be displayed on display device 130 is not changing and processing performed within device 100 is reduced. Accordingly, power module 120 can be used to only power portions of the device 100 used to display the image. In conventional systems, the image to be displayed is stored as rendered image data in memory 112, or memory 119, external to the graphics system 118. The rendered image data associated with the image is then accessed back from memory 112, or memory 119, and provided to the display device 130 at a refresh rate associated with the display device 130. In such a system, power module 120 must power both the portion of the graphics system 118 used to access memory and the memory 112, or memory 119. To conserve power generally used by the conventional system to power memory, such as external memories 112 and 119, system 100 is capable of storing the rendered image data in embedded memory 360, associated with graphics system 118.

Upon entering the screen refresh mode of operation, the power module 120 provides a SYS_MODE signal to the graphics system 118 to indicate the screen refresh mode of operation is to be initiated. In one embodiment, the power module 120 provides the SYS-MODE signal through the local bus 115. In response to the SYS_MODE signal being provided, the rendered image data of the image to be displayed is compressed. In one embodiment, the image is compressed for storage in embedded memory 360. The compressed image can then be decompressed and provided to the display device 130 without keeping the rendered image data in memory 112 and 119. Accordingly, power module 120 can disable memory 112 and/or memory 119, or access of memories 112 and/or 119, to reduce power consumed by system 200 while in the screen refresh mode of operation. The mode of operation associated with system 200 can be detected based on changes in image data provided to the graphics device 117. Alternatively, the mode of operation can be based on user input though user interface 116. Other forms of detecting the mode of operation can be employed. In one embodiment, processing in device 100 is monitored to identify the mode of operation, such as described in pending patent application Ser. No. 10/083,903, entitled "SYSTEM FOR REDUCED POWER CONSUMPTION BY PHASE LOCKED LOOP AND METHOD THEREOF" which is hereby incorporated herein by reference.

Figure 3:
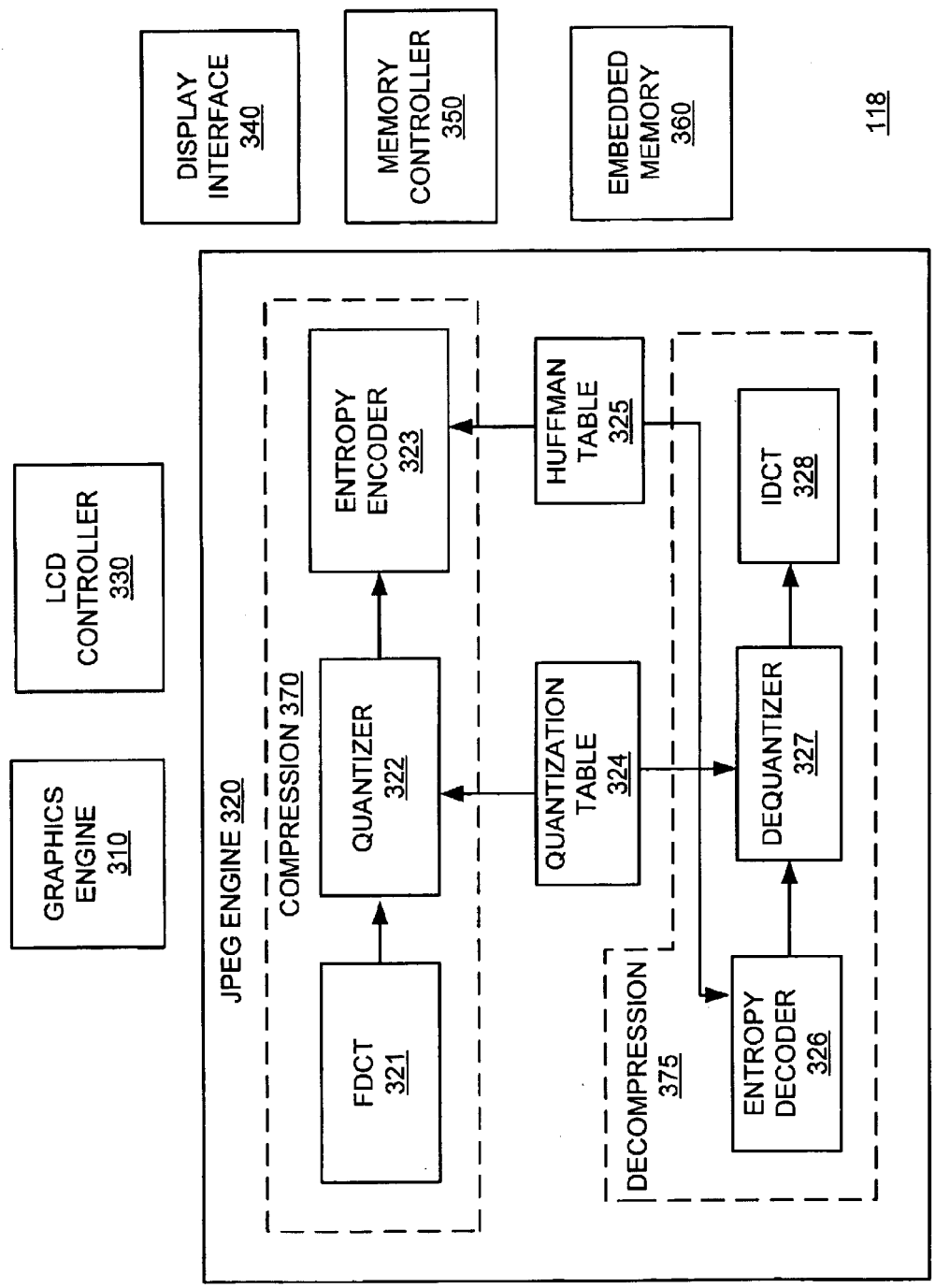
FIG. 3 illustrates, in block diagram form, the graphics system of FIG. 2 in more detail, according to one embodiment of the present disclosure.

Referring now to FIG. 3, the graphics system 118 of FIG. 2 is shown in more detail, according to one embodiment of the present disclosure. Graphics system 118 includes a graphics engine 310, a Joint Pictures Experts Group (JPEG) engine 320, an LCD controller 330, a display interface 340, a memory controller 350, and embedded memory 360.

In one embodiment, graphics engine 310 is used to render image data into rendered image data. The image data includes graphics commands which are processed by the graphics engine 310, such as BitBLT, scaling, object rotation, alpha blending, and anti-aliasing commands. The graphics engine 310 generates a set of rendered image data for each image to be displayed. The rendered image data is generated by the graphics engine 310 in a form to be processed using the display device 130. For example, the graphics engine 310 can generate a set of rendered image data that includes pixel intensity and color values for each pixel on the display device 130. Furthermore, the graphics engine 310 can be used to control other portions of graphics system 118 to ensure images are displayed on the display device 130 at appropriate times. In one embodiment, the display device 130 includes an LCD display device. The LCD controller 330 is used to identify appropriate signals to power the display device 130 to represent the rendered image data. The display interface 340 represents the physical connection used to provide signals from the LCD controller 330 to the display device 130.

The memory controller 350 handles data access with memory integrated within graphics system 118, such as embedded memory 360, and with memory external to graphics system 118, such as memories 112 and 119. Accordingly, embedded memory 360 can be used to store image data to be processed and rendered image data to be displayed. Furthermore, embedded memory 360 can be used as a display buffer to allow images to be provided to the display device 130 at a controlled rate while other processing is performed by the graphics system 118. In one embodiment, rendered image data is compressed for storage in embedded memory 360. The memory controller 350 can be used to pass data among other portions of graphics system 118. Furthermore, the memory controller 360 can be used to access memory external to graphics system 118, such as memories 112 and 119 of FIG. 2.

In one embodiment, the graphics system 118 includes image coder/decoder blocks, such as JPEG engine 320. JPEG engine 320 is generally used to decode JPEG encoded images data. In one embodiment, JPEG engine 320 is further used to JPEG compress rendered image data for storage in embedded memory 360. Accordingly, JPEG engine 320 includes a compression device, such as compression block 370. Compression block 370 includes a transform block, such as forward discrete cosine transform (FDCT) block 321. The FDCT block 321 applies a discrete cosine transform (DCT) to generate a frequency domain representation of received data. Coefficients of the transform generated by the FDCT block 321 are passed to a quantizer 322. The quantizer 322 reduces the number of bits used to represent the transformed coefficients, based on quantization table 324. The quantized coefficients are passed to an entropy encoder 323. The entropy encoder 323 can be used to perform further compression on the quantized coefficients. The entropy encoder 323 uses statistical characteristics to encode the quantized coefficients into a more compact set of data. In the illustrated embodiment, a Huffman table 325 is provided to perform Huffman entropy encoding. Other forms of entropy encoding can be performed, such as arithmetic or run-length coding, without departing from the scope of the present disclosure. The compressed image data can then be stored in embedded memory 360.

The JPEG engine 320 can be further used to decompress compressed image data prior to providing the display data to the display device 130. For example, JPEG engine 320 can include a decompression device, such as decompression block 375. The decompression block 375 is used to generate display data from the image data compressed using the compression block 370. The compressed image data can be processed by an entropy decoder 326. The entropy decoder 326 uses Huffman table 325 to identify quantized coefficients. The quantized coefficients are processed by a dequantizer 327. The dequantizer 327 uses the quantization table 324 to approximate original values of transform coefficients. The coefficients identified by the dequantizer 327 are passed to an inverse DCT (IDCT) block 328 to generate uncompressed image data. The uncompressed image data can then be provided to display device 130 for presentation. In one embodiment, the uncompressed image data is passed through a display buffer, such as through a portion of embedded memory 360 or other memory device, for controlled output to display device 130.

The compression performed by JPEG engine 320 allows rendered image data normally too large for a particular portion of memory, such as embedded memory 360, to be stored in the particular portion of memory. It should be appreciated that other forms of compression can be utilized without departing from the scope of the present disclosure. For example, compression to be performed on the rendered image data can include downscaling, wavelet-based compression, tagged image file (TIF) compression, graphic interchange format (GIF) compression, or other compression type and the type of compression used can be selected without departing from the scope of the present disclosure. Furthermore, the codec processing performed can be performed in software, or other hardware components, external to the graphics system 118.

Figure 4:
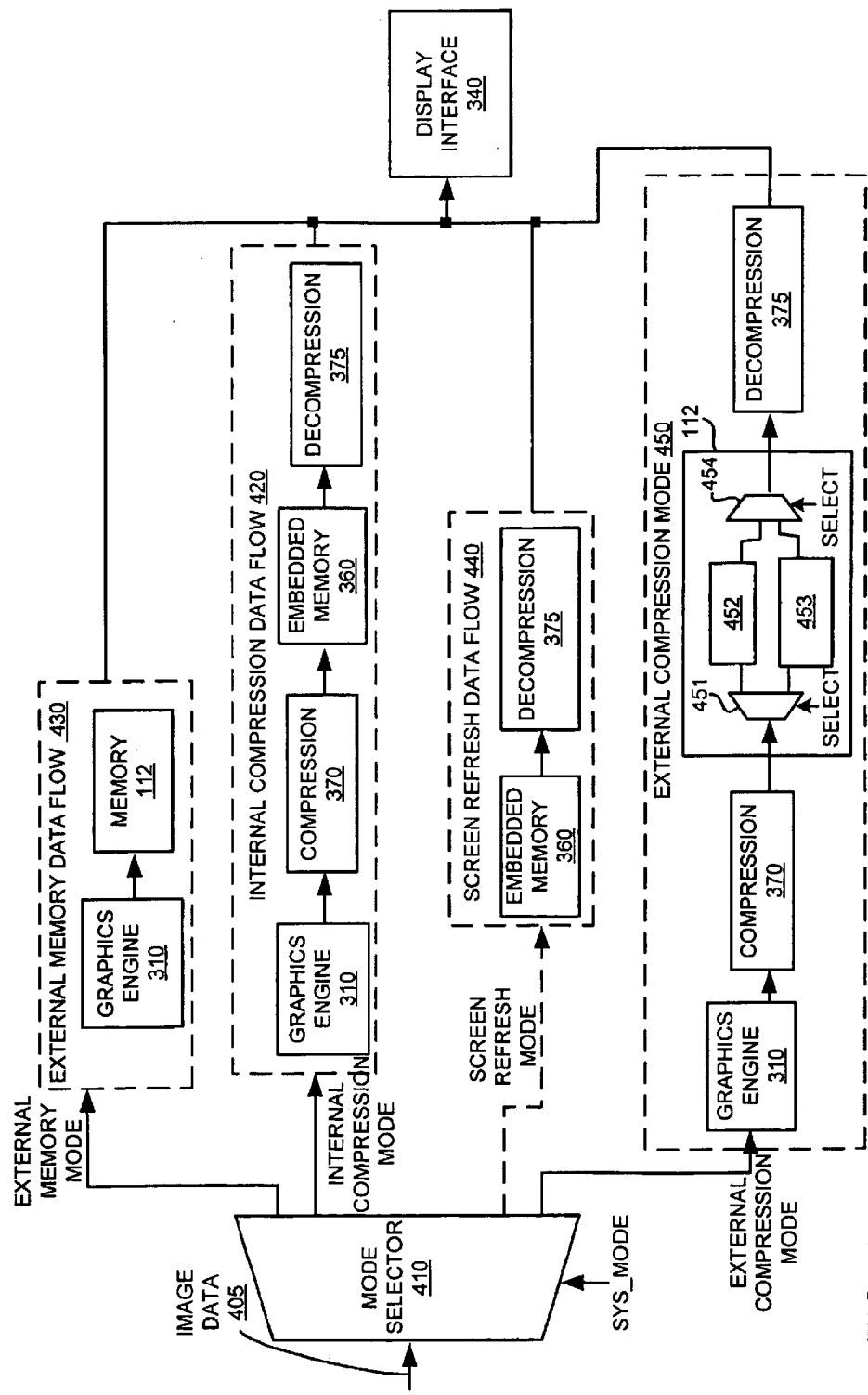
FIG. 4 illustrates, in block diagram form, several data paths for processing image data associated with operating modes of the system of FIG. 1, according to one embodiment of the present disclosure.

Referring now to FIG. 4, a block diagram illustrating various data flows for processing image data within device 100 is shown, according to one embodiment of the present disclosure. A power module, such as power module 120 of FIG. 2, identifies an operating mode of the device 100, or system 200. The identified power mode is reported to the graphics system 118 through the SYS_MODE signal of FIG. 4. In the illustrated embodiment, graphics system 118 processes image data through different data flows, according to different modes identified through the SYS_MODE signal. Data flows 420, 430, 440 and 450 are shown for processing image data 405 for display.

Image data 405 is routed through a mode selector 410. The mode selector 410 identifies which available data flow 420, 430, 440 or 450, is to be used to process the image data 405, based on the SYS_MODE signal. In the illustrated embodiment, the available operating modes include an Internal Compression Mode 420, an External Memory Mode 430, a Screen Refresh Mode 440, and an External Compression Mode 450. It should be appreciated that other modes can exist in addition to or in places of modes described herein.

The image data 405 represents graphics and/or video data to be rendered for display on a display device, such as display device 130 of FIG. 1. Other image data can be received in addition to image data 405, such as MPEG video data and other processing may be required by the graphics system 118 to prepare such data for display and/or rendering. While a data flow for processing image data prior to rendering is not shown, it should be appreciated that such processing can be performed to prepare image data to a form such as image data 405, prior to the data flows 420, 430, 440 and 450 as described herein, and additional processing can be performed without departing from the scope of the present disclosure.

In one embodiment, the SYS_MODE signal indicates that the External Memory Mode is to be used to process image data 405. The External Memory Mode represents a normal, or active mode of operation in which image data to be displayed is changing frame-to-frame. The External Memory Mode can be detected by analyzing received graphics commands or image data to be displayed. Alternatively, the External Memory Mode can be based on detected activity within the portable device 100. In the illustrated embodiment, when the External Memory Mode is identified by the mode selector 410 the image data 405 is processed through the external memory data flow 430. In the external memory data flow 430, the image data 405 is processed using graphics engine 310. As previously discussed, the graphics engine 310 renders the image data 405 into rendered image data for presentation on a display device, such as display device 130. The rendered image data generated by the graphics engine 310 is stored in memory external to the graphics system 118, such as memory 112. The rendered image data stored in memory 112 can then be accessed and provided to display interface 340 for output to display device 130. It should be noted that the rendered image data can be stored in other memory components, such as memory 119, and the memory used to store the rendered image data is selected to be large enough to store the rendered image data.

The rendered image data is generally stored in external memory due to a lack of memory space available in memory integrated within the graphics system 118. In one embodiment, the Screen Refresh Mode is detected. The Screen Refresh Mode represents a mode of operation in which the image to be displayed on the display device 130 does not change. Furthermore, activity within the device 100 and system 200 can be minimal. Accordingly, the memory 112 can be disabled to reduce power consumed by the device 100. However, to allow the memory internal to the graphics system 118, such as embedded memory 360, to be used to support storage of rendered image data, the rendered image data is compressed. In one embodiment, upon entering the Screen Refresh Mode, in which only the internal memory is used, the Internal Compression Mode is enabled through the SYS_MODE signal.

In the Internal Compression Mode, the mode selector 410 provides the image data 405 for processing according to the internal compression data flow 420. In the internal compression data flow 420, the image data 405 is processed by the graphics engine 310 to generate rendered image data. The rendered image data is provided to compression block 370 to generate compressed image data. Compression block 370 processes received rendered image data according to a compression algorithm, as previously discussed. The compressed image data is then stored in embedded memory 360. In one embodiment, data and values in embedded memory 360 which are critical to data processing are transferred to other memory locations. When the compressed image data stored in the embedded memory 360 is ready to be displayed, the compressed image data is processed by decompression block 375 to generate uncompressed image data for output to display device 130. The uncompressed image data generated by the decompression block 375 forms a representation of the rendered image data generated by the graphics engine 310. However, it should be appreciated that the uncompressed image data generated by the decompression block 375 may not be identical to the rendered image data generated by the graphics engine 310, depending on a type of compression being used. The uncompressed image data generated by the decompression block 375 is provided to display interface 340 for output to display device 130. In one embodiment, a display buffer (not shown) is used to control a flow of data provided to the display device 130, despite processing delays that may result from compression and/or decompression being performed.

In one embodiment, once the internal compression data flow 420 is completed, the portable device 100 can enter the Screen Refresh Mode, during which all rendered image data is accessed from the compressed image data stored in the embedded memory 360. Accordingly, in the screen refresh data flow 440, the compressed image data stored in embedded memory 360 is processed by the decompression block 375 to regenerate the uncompressed image data generated in the internal compression data flow 420. The uncompressed image data generated by the decompression block 375 is then provided to the display interface 340 for output to the display device 130. In one embodiment, the graphics system 118 remains in the Screen Refresh Mode until new user activity is identified on the portable device 100 or until new image data is provided to the graphics system 118. It should be noted that the image data to be processed in the screen refresh data flow 440 is the same as the image data received by the graphics engine 310 in the internal compression data flow 420 and no new image data 405 is necessarily accessed while the graphics system 118 is in the Screen Refresh Mode.

In one embodiment, the External Compression Mode is used to store rendered image data in external memory, such as memory 112 or 119. When the External Compression Mode is identified by the mode selector 410, the mode selector 410 enables the graphics system 118 to process the image data 405 according to the external compression mode 450. In the External Compression Mode, the image data 405 is processed by the graphics engine 310 to generate rendered image data. The rendered image data is processed by the compression block 370 to generate compressed image data. The compressed image data can then be stored in the memory 112, external to the graphics system 118. When the stored compressed image data is ready to be displayed, the decompression block 375 processes the stored compressed image data to generate uncompressed image data which is provided to the display device 130, through the display interface 340. The External Compression Mode allows for smaller memory devices to be used to store a greater amount of rendered image data.

In one embodiment, the graphics system 118 operates in a double-buffered memory configuration, in which the memory 112 is used to contain a first buffer 452 and a second buffer 453. In the illustrated embodiment, an input buffer selector 451 is used to identify either the first buffer 453 or the second buffer 454 to use to store compressed image data. Similarly, an output buffer selector 454 is shown to identify one of the buffers 452 or 453 to output image data from. In one embodiment, a SELECT signal is shown to select one of the buffers 452 or 453 at the input buffer selector 451 and to select the other buffer in the output buffer selector 454. For example, while the first buffer 452 is selected to store a first set of compressed image data, the second buffer 453 is selected for outputting a second set of compressed image data. Accordingly, the buffers 452 and 453 can be arranged to allow rendered image data to be stored in one of the buffers while being read from another buffer. Such a buffer arrangement can allow processing delays due to compression/decompression algorithms and rendering to be reduced by allowing previously processed data to be read as new data is being processed and stored. In one embodiment, image data 405 is further stored in one of the buffers 452 or 453 prior to processing by graphics engine 310. It should be appreciated that other memory arrangements and further buffers can be configured without departing from the scope of the present disclosure. Furthermore, while the buffers 452 and 453 are shown as a part of memory 112, the buffers 452 and 453 can represent portions of separate memory components.

The systems described herein may be part of an information handling system. The term "information handling system" refers to any system that is capable of processing information or transferring information from one source to another. An information handling system may be a single device, such as a computer, a hand held computing device, a cable set top box, an internet capable device, and the like. Alternatively, an information handling system may refer to a collection of such devices. It should be appreciated that the system described herein has the advantage of reducing power consumed by the information handling system.

In the preceding detailed description of the embodiments, reference has been made to the accompanying drawings which for a part thereof, and in which is shown by way of illustration specific embodiments in which the disclosure may be practiced. These embodiments are described in sufficient detail to enable those skilled in the art to practice the disclosure, and it is to be understood that other embodiments may be utilized and logical, mechanical and electrical changes may be made without departing from the spirit or scope of the present disclosure. To avoid detail not necessary to enable those skilled in the art to practice the disclosure, the description may omit certain information known to those skilled in the art. Furthermore, many other varied embodiments that incorporate the teaching of the disclosure may be easily constructed by those skilled in the art. According, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method comprising:
   receiving image data;
   when in a first mode of operation:
      rendering the image data to generate rendered image data;
      storing the rendered image data in a first memory; and
      providing the rendered image data to a display device driver;
   when in a second mode of operation:
      disabling the first memory;
      rendering the image data to generate rendered image data;
      compressing the rendered image data to generate a compressed image data;
      storing the compressed image data in a second memory different from the first memory;
      decompressing the compressed image data to generate a decompressed image data; and
      providing the decompressed image data to the display device driver.

2. The method of claim 1, wherein the first memory is external relative to a rendering device used to render the image data.

3. The method of claim 2, wherein the second memory is integrated with the rendering device.

4. The method of claim 3, wherein the second memory is integrated on a common substrate with a decompression device, wherein the decompression device is used decompress the compressed image data.

5. The method of claim 2, wherein the second memory is integrated on a common substrate with a decompression device, wherein the decompression device is used to decompress the compressed image data.

6. The method of claim 1, wherein the first mode of operation is an active mode of operation.

7. The method of claim 6, wherein the second mode of operation is a screen refresh mode.

8. The method of claim 1, further comprising repeating the steps of decompressing and providing while in the second mode of operation.

9. The method of claim 1, wherein the compressed image data includes one of the set of compressed image data comprising Joint Pictures Experts Group compressed image data, downscaled image data, wavelet-based compressed image data, Tagged Image File compressed image data, or Graphic Interchange Format compressed image data.

10. The method of claim 1, wherein the display device driver includes a liquid crystal display device driver.

11. A method of displaying image data, the method comprising:
   when a portable information system is in an active mode of operation;
      accessing rendered image data from an external memory location; and
      providing the rendered image data to a display device driver;
   when a portable information system is in a refresh mode of operation:
      disabling the external memory location;
      accessing compressed rendered image data from an integrated memory location;
      decompressing the compressed rendered image data to generate decompressed rendered image data; and
      providing the decompressed rendered image data to a display device driver.

12. The method of claim 11, further comprising repeating the steps of accessing, decompressing and providing when in the refresh mode of operation.

13. A system comprising:
   a processor;
   a first memory coupled to said processor;
   a rendering device, coupled to said processor, to provide rendered image data to a display device driver, said rendering device having;

a graphics engine to generate rendered image data;
a compression device to compress rendered image data to form compressed rendered image data;
a second memory, different from the first memory, to store said compressed rendered image data;
a decompression device to decompress said compressed rendered image data to form decompressed image data;
a select module to:
  identify a mode of operation associated with the system;
  enable one of a plurality of data flows associated with the rendering device based on the identified mode of operation; and
  enable or disable access to the first memory based on the identified mode of operation; and
said display device driver to output said decompressed image data.

14. The system of claim 13, wherein said display device driver outputs said decompressed image data to a display device.

15. The system of claim 14, wherein the display device includes a liquid crystal display device.

16. The system of claim 13, wherein said first memory is external to said rendering device and said second memory is integrated within said rendering device.

17. The system of claim 13, wherein:
the select module enables access to the first memory when the identified mode of operation includes an active mode; and
the select module disables access to the first memory when the identified mode of operation includes a refresh screen mode.

18. A system for providing rendered image data to a display device driver, said system comprising:
means for identifying a current mode of operation;
when in a first mode of operation, means for providing rendered image data for storage in a first memory;
when in a second mode of operation:
  means for disabling the first memory;
  means for compressing the rendered image data to form compressed image data;
  means for storing the compressed image data in a second memory;
  means for providing the compressed image data to the display device driver.

19. The system of claim 18, wherein the first mode of operation includes an active mode of operation and the second mode of operation includes a screen refresh mode of operation.

* * * * *

UNITED STATES PATENT AND TRADEMARK OFFICE
CERTIFICATE OF CORRECTION

PATENT NO.       : 6,992,675 B2
APPLICATION NO.  : 10/357590
DATED            : January 31, 2006
INVENTOR(S)      : Milivoje Aleksic et al.

It is certified that error appears in the above-identified patent and that said Letters Patent is hereby corrected as shown below:

Column 10, line 20, change "used decompress" to "used to decompress"

Column 10, line 67, change "having;" to "having:"

Signed and Sealed this

Twenty-second Day of August, 2006

JON W. DUDAS
*Director of the United States Patent and Trademark Office*